(No Model.)
W. G. PRICE.
STREET CAR BRAKE.
No. 572,825. Patented Dec. 8, 1896.
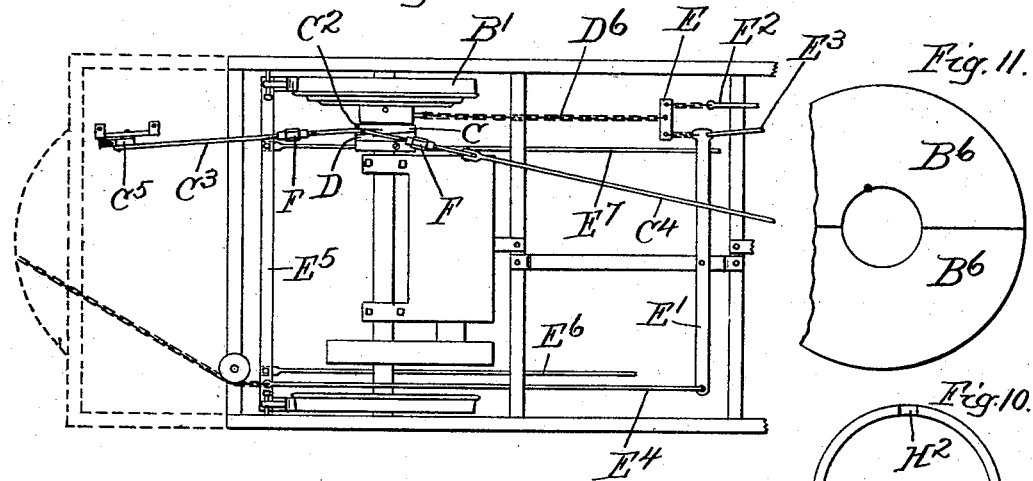
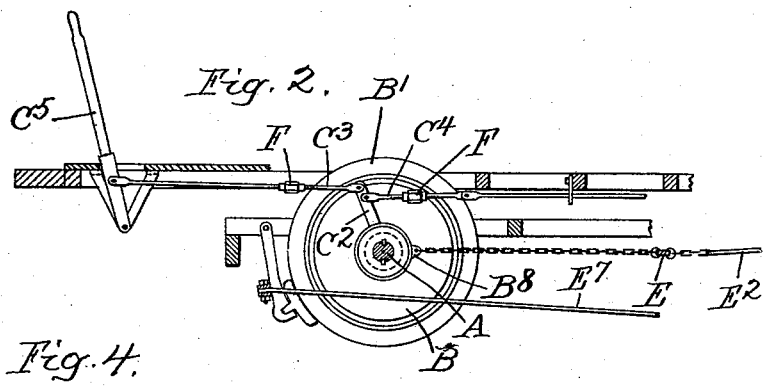
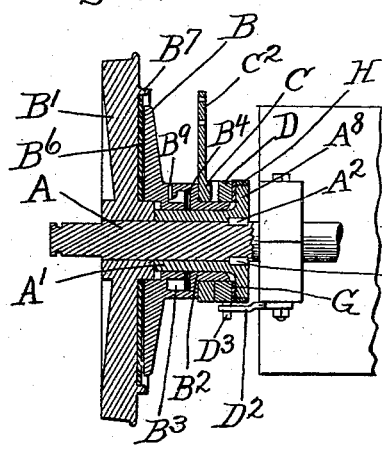
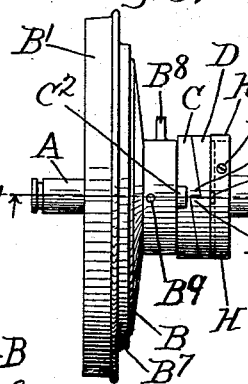
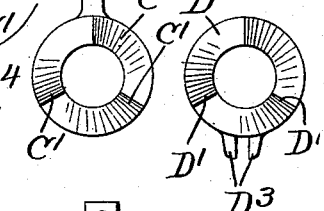
Witnesses.
E. T. Wray.
Donald M. Carter.
Inventor
William G. Price,
by Francis W. Parker,
his Atty.

UNITED STATES PATENT OFFICE.

WILLIAM G. PRICE, OF CHICAGO, ILLINOIS, ASSIGNOR OF ONE-HALF TO MENARD K. BOWEN, OF SAME PLACE.

STREET-CAR BRAKE.

SPECIFICATION forming part of Letters Patent No. 572,825, dated December 8, 1896.

Application filed June 12, 1896. Serial No. 595,298. (No model.)

*To all whom it may concern:*

Be it known that I, WILLIAM G. PRICE, a citizen of the United States, residing at Chicago, in the county of Cook and State of Illinois, have invented certain Improvements in Street-Car Brakes, of which the following is a specification.

My invention relates to brakes for vehicles, and has for its object to provide a new and improved brake particularly adapted for street-cars and the like.

My invention is illustrated in the accompanying drawings, wherein—

Figure 1 is a plan view of part of a street-car brake embodying my invention. Fig. 2 is a side elevation of the same in part section. Fig. 3 is a view of one wheel of the car, showing part of the brake-operating mechanism. Fig. 4 is a section on line 4 4, Fig. 3. Fig. 5 is an enlarged section through the braking-disk and connected sleeve associated with the car-wheel, showing the oil-hole and oil-cavity associated therewith. Figs. 6 and 7 are views of the toothed rings encircling the axle, the relative movement of which operates the brake. Fig. 8 is a view of the projecting piece which is connected to some stationary part of the car and holds one of said rings from rotating. Fig. 9 is a view of a washer by which the wear of the several parts is taken up. Fig. 10 is a view of the ring which holds this washer in place. Fig. 11 is a view of the annular piece or strip of material placed between the wheel and the friction-disk.

Like letters refer to like parts throughout the several figures.

In the drawings I have shown a specific form of a device embodying my invention in which the brake is operated by means of one of the wheels of the car, but it is evident that instead of using this construction I may use a construction in which the brake is operated by any moving part of the car or any part connected with any such moving part. I have also shown my invention in connection with a street-car propelled by electric motors, and have set forth a detailed construction peculiarly adapted for such cars, but it is of course evident that this construction in its details may be greatly changed and still embody my invention.

Mounted upon the axle A is a sleeve A', which is made to rotate with said axle by means of the keys $A^2 A^2$. The braking-disk B is associated with the wheel B' and is provided with a hub or projecting part $B^2$, which surrounds the sleeve A'. This hub or projecting part is hollowed out at $B^3$, as shown, to form an annular receptacle for oil. A wick $B^4$ is placed in this receptacle and comes in contact with the sleeve A', so as to convey the oil to the inner surface of the hub $B^2$ and the outer surface of the sleeve A'. An oil-hole $B^9$ in the hub $B^2$ communicates with the receptacle $B^3$. I prefer to have the receptacle $B^3$ rectangular in shape, as shown, except at the point where the oil-hole $B^9$ connects therewith. At this point a portion of the metal $B^5$ is left in place, so as to form a protecting shield around the oil-hole. By this construction the oil is prevented from escaping when the disk B is moved, so as to move the oil-hole below the horizontal plane passing through the center of the axle. If the oil-hole is moved to such a position, the oil instead of flowing out of said oil-hole will be held in the receptacle by the shield $B^5$.

A strip $B^6$, of any desirable material, as, for example, leather, is placed between the disk B and the wheel B', so as to increase the friction and prevent the wear of the parts. Said strip is preferably made of two parts, as shown in Fig. 11, so that it can be easily removed and replaced, the parts being held in position by the projecting lug or flange $B^7$ on the car-wheel. I prefer to make this strip of two pieces, but it is of course evident that it may be divided into any desirable number of pieces. By this construction the strip of leather may be easily removed or replaced. Two toothed or ratchet rings C D encircle the hub $B^2$ of the friction-disk, the teeth C' D' engaging each other, as shown in Fig. 3. The ring D is held stationary in any convenient manner, as by means of the projecting arm $D^2$, connected with some stationary part of the car, said ring being provided with the lugs $D^3$, between which said arm projects. As shown in the drawings, the projecting arm $D^2$ is connected with the bearing of the motor. The ring C is provided with the projecting arm $C^2$, to which are connected the rods $C^3$ $C^4$, said ring being free to rotate about the hub $B^2$. The rod $C^3$ is connected at one end of the car to the operating-handle $C^5$ and the rod $C^4$ is connected with a similar operating-handle at the other end of the car. These operating-handles are so constructed that the arm $C^2$ and ring C may be moved thereby. The hub $B^2$ is provided with the lug $B^8$, which is connected by means of a rod, rope, or chain $D^6$ or similar device to the equalizer E. One end of said equalizer is connected with the lever $E'$, the other end being connected with the rod $E^2$, which is connected with one of the brake-beams. The rod $E^3$ is connected with the brakes of the trailer in any desirable manner. A rod $E^4$ is connected with the other end of the lever $E'$ and is adapted to be connected with the trailing-car when attached to the other end of the car upon which the brake mechanism is located.

The brake-beams at each end of the car are connected together by the rods $E^6$ $E^7$. When the friction-disk B is brought into contact with the wheel $B'$, it tends to retard said wheel to a certain extent, and therefore if the brake-shoe associated with the wheel $B'$ is applied with the same force to said wheel as to the other wheels the wheel $B'$ will be stopped before the other wheels are stopped. To prevent this, I connect the rod $E^7$ with said brake-shoe, as shown in Fig. 2, so as to make allowance for the braking effect produced by the disk B, or, in other words, I connect the rod $E^7$ with the brake-shoe associated with the wheel $B'$, so that less force is exerted by said brake-shoe than is exerted by the brake-shoe associated with the other wheels. When the ring C is moved with relation to the ring D, it will be seen that the two rings will be forced apart. Since the ring D comes in contact with the collar on the end of the sleeve $A'$ and the ring C against the projecting part of the hub $B^2$, it will be seen that when said rings are separated the disk B will be forced against the wheel $B'$.

As the parts wear it will be seen that the distance through which the arm $C^2$, and hence the operating-handle $C^5$, is moved to bring the disk B against the wheel $B'$ will gradually increase. In order to allow this to be done, and still keep the operating-handles in substantially the same position when the brake is off, I provide each of the rods $C^3$ $C^4$ with the turnbuckles F F. I also provide another means for adjustment on account of wear of the parts. When said parts become worn so that the adjustment cannot be easily made by the turnbuckles F F, I provide a washer G, which is preferably made in two parts, said washer being preferably inserted between the ring D and the projecting collar $A^8$ on the sleeve $A'$. This washer is held in place by means of the ring H, which encircles the projecting collar $A^8$ and which is held in place by means of the set-screw $H'$. This ring is provided with the notches $H^2$, which are engaged by the projections $H^3$ on the washer G, said washer being thereby held from rotating. The ring H can be moved along the projecting collar $A^8$ so as to project over the washer, thus holding it in position. I may omit the sleeve $A'$ and connect the projecting collar $A^8$ directly with the axle in any desired manner, and I may also change the relations of these parts and omit some of them and use others not herein shown and described.

I have described these several parts in detail, but it is evident that they may be greatly varied in form, construction, and arrangement without departing from the spirit of my invention, and I therefore do not wish to be limited to the constructions herein shown and described.

The use and operation of my invention are as follows: When it is desired to apply the brakes to the wheels, the operating-arm $C^5$ is moved, so as to move the ring C. As the ring D is held stationary and the teeth upon the rings engage each other, this movement of the ring C causes the two rings to separate. The disk B is therefore pressed against the wheel $B'$, and as said wheel is rotating said disk and accompanying parts are carried around with said wheel and a force is applied to the chain $D^6$. Since this chain is connected with the brake-shoes, this movement of the chain applies the brakes to the wheel in the ordinary manner. When the operating-handle is moved in the opposite direction, so as to move the ring C back to its former position, the two rings will approach each other and the disk B will be freed from the wheel. The method by which the parts are adjusted for wear will be readily understood from the foregoing explanation. It will therefore be seen that I have here a simple and convenient mechanism by which the brakes may be readily applied to the car by means of some moving part of the car. The strip of leather or other material placed between the friction-disk and the wheel is so constructed that it may be easily removed and replaced while the parts are in position. When my invention is used upon cars operated by electric motors, the friction-disk can be moved away from the wheel only a very short distance, as the motors on the car-axle prevent any extended movement of this disk. If the strip of leather or other material is made of one piece, it becomes necessary to remove the wheel in order to renew this piece. By dividing the leather into two or more pieces it may be removed and new leathers replaced while the parts are in position. When it is desired to remove this strip of leather or other material, the disk is moved away from the wheel as far as possible, and the leather is then grasped by means of a pair of pincers, for example, and is removed part at a time. The new leather is then placed in position and is held in such position by means of the flange on the wheel.

I have shown the lug $B^7$, which holds the strip B⁶ in position, as being continuous, but it is of course evident that this holding device may consist of a series of separated lugs, if desired.

I claim—

1. A brake mechanism for cars comprising a friction-disk opposed to a moving part of the car, two toothed parts associated with said disk, the teeth of said parts being in engagement, one of said parts provided with a stop connected with said disk, the other part being provided with a stop connected with some part of the car, whereby their lateral motion is limited, a split washer adapted to be inserted between one of said rings, and the stop associated with the car, and a holding device for said washer adapted to hold the two parts in position, an operating-handle connected with one of said parts so that they may be moved with relation to each other, one or more brake-shoes associated with the wheels of the car and connecting mechanism between said brake-shoes and said friction-disk.

2. A brake mechanism for cars or the like comprising a friction-disk upon the car-axle, and opposed to a part connected with said axle, two rings surrounding said axle and provided with wedge-shaped teeth normally in engagement, one of said rings engaging said disk or a part thereof, a collar surrounding the axle and in proximity to the other ring and adapted to limit its lateral motion, a split washer adapted to be inserted between said toothed ring and the collar on the axle when the parts become worn, a ring surrounding said collar, and connected therewith by a set-screw or the like, said ring adapted to project over said washer and hold it in place, a connection between one of said rings, and an operating-handle on the car, one or more brake-shoes associated with the wheel of said car, said brake-shoes being operatively connected with said disk.

3. A friction-disk for car-brakes provided with a projecting hub, an annular recess in said hub adapted to contain oil, a wick in said groove adapted to conduct the oil to the bearing-surface of said hub, an opening or oil-hole by which the oil may be conveyed to said receptacle, a protecting-shield or the like within said receptacle, surrounding said opening and adapted to prevent the oil from flowing out when said hub is rotated.

4. In a brake mechanism for street-cars, the combination of the brake-setting device with a moving part, the two adapted to be frictionally connected, and relatively-movable parts which when operated force the brake-setting device against its opposed movable part, and a sectional removable annular adjusting-washer, and a stop recessed to receive the same, said washer adapted to engage one of said relatively-movable parts.

5. A brake mechanism for cars containing a brake-setting device, a moving part with which it is adapted to be operatively engaged, means for bringing the two parts into engagement, comprising two relatively-rotatable parts, engaging on inclined surfaces, stops for limiting the lateral motion of said relatively-rotatable parts, a split washer adapted to be inserted between one of said stops and one of said parts, and a holding device adapted to hold said split washer in position.

WILLIAM G. PRICE.

Witnesses:
BERTHA C. SIMS,
LILLEY W. JOHNSTONE.